US007900034B2

(12) United States Patent
Ganesh et al.

(10) Patent No.: US 7,900,034 B2
(45) Date of Patent: Mar. 1, 2011

(54) BOOTING SOFTWARE PARTITION WITH NETWORK FILE SYSTEM

(75) Inventors: Perinkulam I. Ganesh, Round Rock, TX (US); Amit Gurdasani, Karnataka (IN); Lance W. Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 11/831,701

(22) Filed: Jul. 31, 2007

(65) Prior Publication Data
US 2009/0037718 A1 Feb. 5, 2009

(51) Int. Cl.
*G06F 9/00* (2006.01)
*G06F 12/00* (2006.01)
*G06F 15/177* (2006.01)
*G06F 15/173* (2006.01)
*G06F 9/445* (2006.01)
*G06F 9/46* (2006.01)

(52) U.S. Cl. .............. 713/2; 713/1; 707/827; 709/222; 709/226; 717/176; 718/104

(58) Field of Classification Search .............. 713/1, 2; 707/827; 709/222, 226; 717/176; 718/104
See application file for complete search history.

(56) References Cited

U.S. PATENT DOCUMENTS

| 7,437,556 | B2 * | 10/2008 | Tucker et al. ............... 713/164 |
| 7,447,896 | B2 * | 11/2008 | Smith et al. ................... 713/2 |
| 7,490,074 | B1 * | 2/2009 | Leonard et al. .................. 1/1 |
| 7,529,807 | B1 * | 5/2009 | King et al. .................... 709/217 |
| 2005/0144493 | A1 | 6/2005 | Cromer et al. |
| 2006/0015931 | A1 | 1/2006 | Davis et al. |

OTHER PUBLICATIONS

Bealkowski, R. Cronk, Remote Program Load of a Diskless Initial Microcode Load Computer System, IBM Technical Disclosure Bulletin, Dec. 1992, p. 250, Boca Raton.

* cited by examiner

*Primary Examiner* — Stefan Stoynov
(74) *Attorney, Agent, or Firm* — Dillon & Yudell LLP (57) ABSTRACT

In a software partition (SWPAR) environment, a method, system and computer program product enables a SWPAR to be remotely booted, independent of the booting of the OS on the global system environment, using network file system (NFS) services and protocols. A request to mount a NFS, hosted by an external server into a SWPAR environment is transmitted. The NFS services are automatically transitioning to a first operating state that enables support for user-level NFS services without requiring the NFS services be active. The SWPAR is automatically booted and access to the SWPAR provided during operation of the NFS services in the first operating state. Once the SWPAR has completed booting, the NFS services is transitioned back to a normal operating state in which SWPAR operates as a standalone device providing its own user-level NFS services.

17 Claims, 4 Drawing Sheets

BOOTING SOFTWARE PARTITION WITH NETWORK FILE SYSTEM

BACKGROUND

1. Technical Field

The present invention generally relates to computer systems and in particular to software partitions in computer systems.

2. Description of the Related Art

Software partitions is a new construct utilized to divide up resources of a single computing device (or server), with a single operating system instance into multiple, individually addressable and accessible partitions. With software partitions on a single computing device, different clients/users may be access shared services and/or resources of the same computing device, via different software partitions. Each client/user sees the software partition as a standalone device, having a separate instance of the global operation system, and complete with the device's own set of unique IP address, mail, telnet and other service.

Normally for such partitions, the entire file system data is stored on disks, which are local to the computing device. The partitions can be booted, accessed and shutdown from the local disks, similar to a standalone system. Such implementation does not allow mobility of software partitions from one computing device to another. For mobile software partitions, the entire file system has to reside on a remote file system, such as a network file system (NFS). Such partitions cannot be booted locally and has to boot off of the NFS.

SUMMARY OF ILLUSTRATIVE EMBODIMENTS

Disclosed is a method, system and computer program product for enabling a software partition to be remotely booted, independent of the booting of the OS of the global system environment, using NFS services and protocols. A single instance of an operating system is divided into a plurality of software partitions (SWPARS), which possess the capability of running independently, emulating standalone devices. The SWPARs are provided with NFS services, modified to enable the SPARs to be remotely booted, accessed, and shutdown from any client device which supports network file system (NFS) protocol.

Specifically, NFS isolation for the SWPAR, the NFS kernel (which is supporting all the SWPARS) is modified to (1) recognize when NFS requests are coming from within a SWPAR and (2) modify the NFS communications so that the NFS communications appear as if the NFS communications are coming from the SWPAR. With these modifications, the requests no longer appear as if the requests are coming from the global environment rather than the SWPAR. The modification to the NFS services also enables mobility of the SWPARs.

Several new NFS states are created including a state that handles lock requests without the service actually being active. Additionally, a further enhancement provides one or more procedures that transition NFS out of the new NFS state when the user level services become available. Multiple SWPARS may be booted, accessed, and/or shutdown without interrupting adjacent SWPARs.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for enabling a software partition to be remotely booted, independent of the booting of the OS on the global system environment, using NFS services and protocols. A single instance of an operating system is divided into a plurality of software partitions (SWPARS), which possess the capability of running independently, emulating standalone devices. The SWPARs are provided with NFS services, modified to enable the SPARs to be remotely booted, accessed, and shutdown from any client device which supports network file system (NFS) protocol. The modification to the NFS services also enables mobility of the SWPARs.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
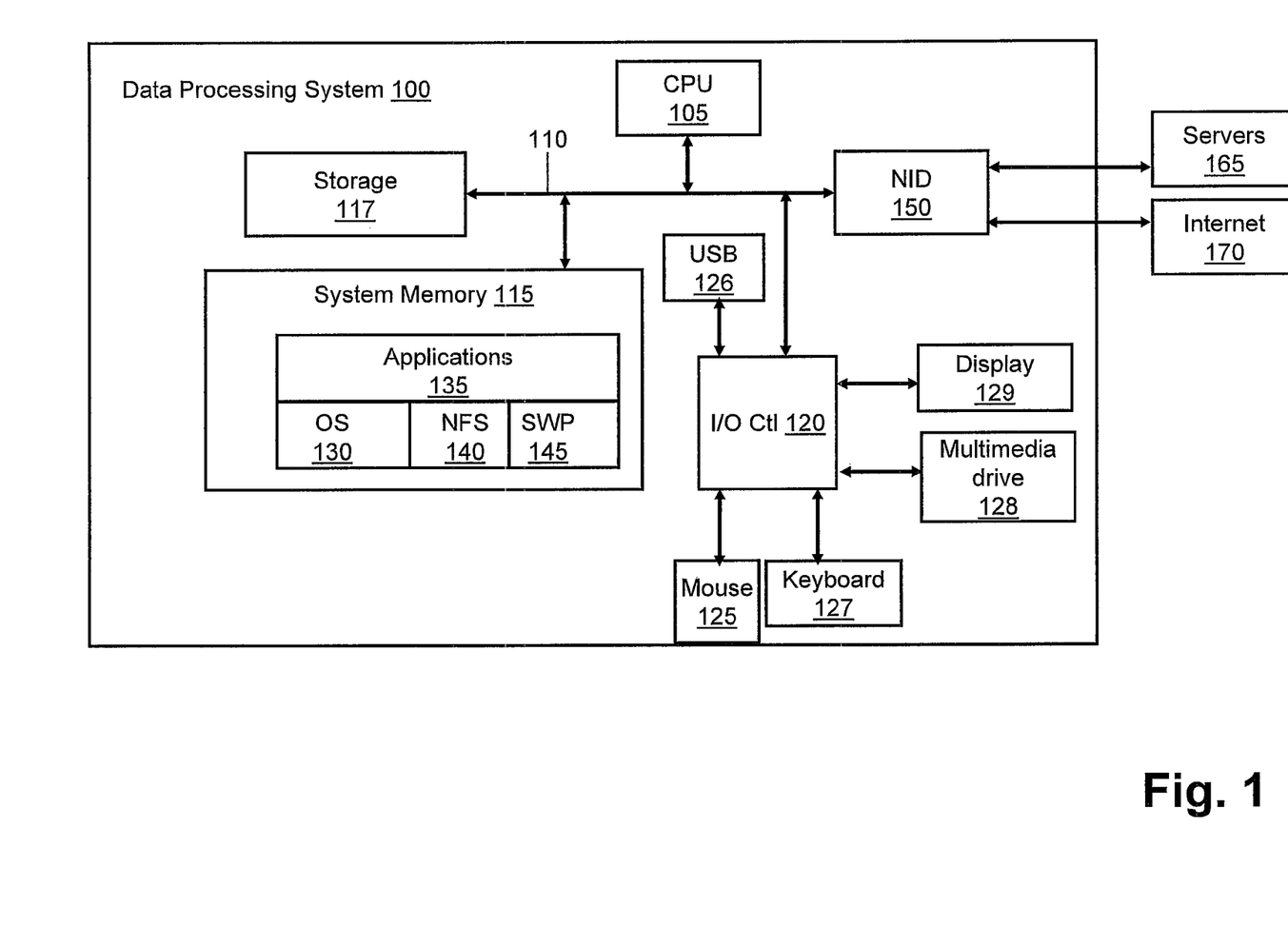
FIG. 1 is a diagram of an example data processing system (DPS) with software partitions (SWPARs), according to one embodiment of the invention.

With reference now to the figures, FIG. 1 depicts a block diagram representation of a data processing system (DPS) (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored. DPS 100 is also illustrated with a network interface device (NID) 150, with which DPS 100 connects to one or more servers 165 via an access network, such as the Internet 170.

In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example. According to the described embodiments (and as further provided within the description of FIG. 2 below), the network supports NFS protocol, by which remote devices (clients, servers, users) access NFS 140 provided by one of multiple software partitions supported by DPS 100.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute or Advanced Interactive Executive—AIX—, registered trademark of International Business Machines—IBM), applications 135, NFS (services) 140 and software partition (SWPAR) utility 145. NFS 140 may be a part of the OS kernel. In actual implementation, components or code of OS 130, and NFS 140 may be combined with those of SWPAR utility 145, collectively providing the various functional features of the invention when the corresponding code is executed by the CPU 105. For simplicity, SWPAR utility 145 is illustrated and described as a stand alone or separate software/firmware component, which is added to an existing OS to provide/support the specific novel functions described herein.

CPU 105 executes SWPAR utility 145 as well as OS 130 and NFS 140 Among the software instructions provided by SWPAR utility 145, and which are specific to the invention, are: (a) code for establishing SWPARS; (b) code for providing isolation of software services, applications, and administration via SWPARS; (c) code for ensuring seamless SWPAR booting and file integrity when the file system is remote, such as file systems provided by NFS; and (d) code for exporting SWPAR file system images utilizing NFS protocol. For simplicity of the description, the collective body of code that enables these various features is referred to herein as SWPAR utility 145. According to the illustrative embodiment, when CPU 105 executes SWPAR utility 145, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system. When running AIX as the OS 130, the software partitions may interchangeably be referred to as workload partitions. For simplicity and consistency in the description of the invention, the term software partition (SWPAR) shall be utilized, and it is understood that that term represents any type of software construct that is similarly constructed on a single instance of an OS, regardless of the specific proprietary name utilized to describe the construct.

Within a single instance of an operating system, flexible software-defined boundaries are utilized to create SWPARS. SWPARS permit portions of the operating system to be partitioned and each assigned a unique IP address and other operating parameters. In addition to IP addresses each SWPAR has separate devices, separate hostnames and separate system services such as mail, telnetd, and others. SWPARS provide the convenience of a standalone system, but SWPARS do not require a local hard disk. With the described embodiments, SWPARS may be remotely booted, accessed, and shutdown from any device which supports network file system (NFS) protocol. In the illustrative embodiments, the NFS protocol of a remote data processing system (such as DPS 100) allows multiple devices to access a single SWPAR.

NFS protocol provides transparent access to shared files on remote hosts. The NFS protocol is designed to be transferable across various machines, operating systems, network architectures, and transport protocols. In one embodiment, SWPARS on a remote host may be booted, accessed, and managed from any server. Thus, according to the illustrative embodiments, there are no requirements for protocols other than the NFS protocol to implement SWPAR boot (for example, protocols such as rarpd, bootp, tftpd, et al., are not required). Therefore, SWPAR is capable of booting from any device that supports NFS protocol, including a device within a storage area network (SAN).

In addition, according to one embodiment of the invention, booting a SWPAR does not require the single instance of the operating system to be rebooted. Unlike booting a diskless system from scratch, a SWPAR is not booted from scratch, and the global OS has to first be booted and operational before access to the SWPAR is supported. For example, a single instance of the OS (e.g., AIX) runs on the computer system and hosts the SWPARS. This single OS instance is referred to as the global environment. To most applications, SWPARS appear as a separate instance of AIX, and most applications are unaware that there is a single instance of AIX that is hosting their SWPAR and, perhaps hundreds of other SWPARs. Outside clients are also unaware of the SWPAR-to-single system instance relationship. These outside clients mail to and telnet to the SWPAR as if the SWPAR was a standalone instance of the OS.

In addition to the above global system services, SWPARs are also provided NFS services. Users within the SWPAR thus have the ability to create NFS mounts. Also, the embodiments provide the ability of the SWPARS to be move from one system to another (i.e., to be mobile) by enabling all network activity, particularly network and NFS activity (including locks) to appear to come from the SWPAR, and not from the global environment. To achieve this functionality, distinct NFS services are provided for the SWPAR. Then, to boot the SWPAR, the following steps are performed, preferably in order:

1. Configure the SWPAR devices;
2. Start the initial process which starts the SWPAR system services; and
3. Start the SWPAR NFS services;

Notably, with conventional application of SWPARs, the above steps 1 and 2 require NFS services. Further, because these latter steps happen before NFS is started for the SWPAR, the conventional application could not make it appear as though the NFS requests originated from the SWPAR and not from the global environment.

As provided herein, the described, exemplary embodiments of the present invention solve the above problem and enable the booting of SWPARS, when all the file systems are based upon NFS. That is, the invention enables the above steps 1 and 2 to be completed and provide the appearance that the NFS requests originated from the SWPAR, rather than from the global environment.

As described, each SWPAR has it's own network address and appears to network clients as a stand alone network node. Additionally, the illustrative embodiments enable each SWPAR to be isolated in terms of NFS and appear to NFS servers (i.e., both file and lock servers) as a standalone network node, which is a requirement for mobility. Thus, implementation of functional features of the described embodiments allows for SWPARs to achieve mobility, so long as the file systems are NFS-based.

NFS in AIX (as an example OS) is implemented as a combination of kernel and user level components. To implement NFS isolation for the SWPAR, the NFS kernel (which is supporting all the SWPARS) is modified to (1) recognize when NFS requests are coming from within a SWPAR and (2) modify the NFS communications so that the NFS communications appear as if the NFS communications are coming from the SWPAR. With these modifications, the requests no longer appear as if the requests are coming from the global environment rather than the SWPAR.

In one embodiment, implementation of the above modifications is especially critical for NFS lock requests. With conventional methods, when a request is received with a lock request, then the NFS lock server would grant the lock to the global node and not the SWPAR. Then, the lock could not be move with the SWPAR to another host node. Also, if any NFS state was tied to the single instance global environment hosting the SWPAR, the SWPAR could not move to another host without disrupting NFS service.

For the user level components of NFS (e.g., portmap, rpc.lockd, rpc.statd) separate instances are created for each SWPAR. Thus, just as each SWPAR has a separate sendmail and inetd daemon, the SWPARs are also provided separate portmapper, rpc.lockd, and rpc.statd daemons. In order to start these user level components of NFS, certain initial processes are required to be started. With conventional implementation, these initial processes themselves require NFS (specifically portmapper and lockd). However, the embodiments of the invention overcome the above limitation by providing a new state for NFS. This new NFS state is one that handles lock and portmapper requests without these services actually being active. Additionally, a further enhancement provides one or more procedures that transition NFS out of this new NFS state when the user level services become available.

The following steps illustrate certain implementation features of the invention:

(1) Phase of Boot (or Start) NFS state
(2) Configuring SWPAR devices Access handled through the global node
(3) Starting initial Processes NFS transitioned to a newly invented state where Lock calls are handled without portmapper and lockd user Level components being active. For example the NFS kernel component is forced into a polling mode for acquiring NFS locks instead of relying on lockd's callback routine to handle these;
(4) NFS user level components started NFS transitioned from special state to normal state.

Figure 2:
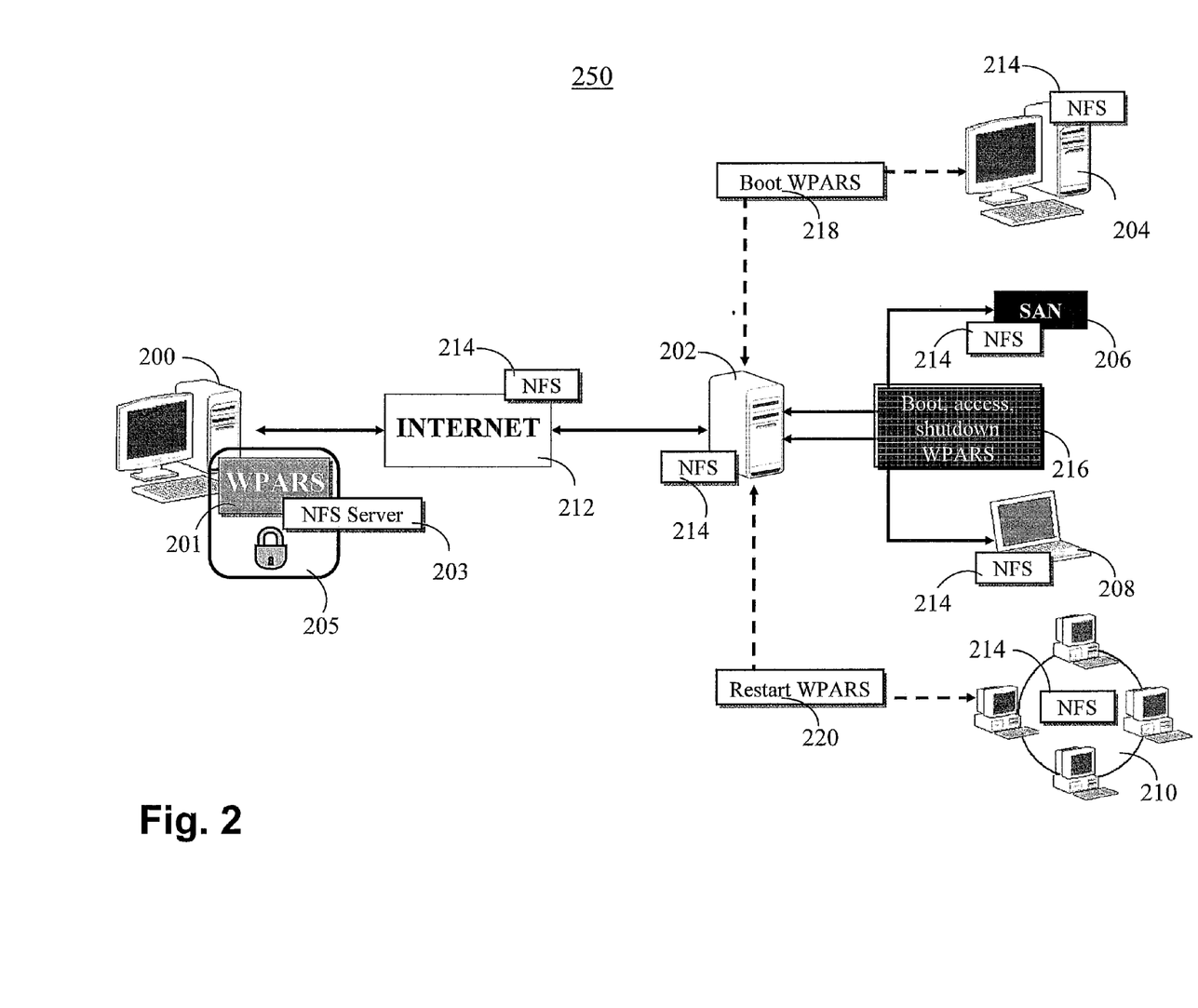
FIG. 2 is a diagram of a network of computers communicatively connected to a computing device, such as DPS of FIG. 1, via NFS protocol, in accordance with one embodiment of the invention.

With reference now to FIG. 2 which illustrates a network of devices that utilize NFS protocol 214 to access software partitions (SWPARs) 201 with NFS file system (or SWPARs file system 201). Network 250 of FIG. 2 comprises remote DPS 200 which is accessed by central server 202 via Internet 212. Network 250 also comprises the following devices which support file and data transmission and other operations utilizing NFS protocol 214: client computer 204, device(s) within storage area network (SAN) 206, client laptop 208, and device(s) within computer network 210. NFS protocol 214 is designed to be portable across various machines, operating systems, network architectures, and transparent protocols. In one embodiment, any device that supports NFS protocol 214 and is authorized is capable of simultaneously accessing SWPARs file system 201 on remote DPS 200.

SWPARs file system 201 provides isolation of software services, applications, and administration within a single operating system. To preserve mobility of SWPARs file system 201, the file system resides on remote DPS 200. Utilizing NFS server 203 on remote DPS 200 increases the versatility in devices capable accessing SWPARs file system 201.

NFS server 203 permits a device such as client computer 204, device(s) within storage area network (SAN) 206, client laptop 208, and device(s) within client network 210 to access SWPARs file system 201 on remote DPS 200. In one embodiment SWPARs file system 201 may be booted, accessed, and shutdown from client computer 204, client laptop 208, device(s) within storage area network (SAN) 206, and device(s) within computer network 210 via central server 202. Whether accessing SWPARs file system 201 from one server or multiple servers, SWPARs file system 201 are booted separately without disrupting any previously booted SWPARs or requiring the single instance of the operating system to be rebooted.

NFS server 203 implements daemon processes to permit accessibility to SWPARS file system 201. Devices require NFS protocol 214 for remote booting and access to SWPARS file system 201 on remote DPS 200. Devices that support NFS protocol 214 may be utilized to gain access to the remote SWPAR file system 201 through NFS server 203.

Boot, access, shutdown request 216 permits management of specific SWPARs on SWPARS file system 201 from any device that supports NFS protocol 214. Boot SWPARS request 218 permits booting SWPARS file system 201 from a first device that supports NFS protocol 214 and restart SWPARS request 220 permits restarting SWPARS file system 201 from a second device that supports NFS protocol 214.

Although the files are accessible from any device that supports NFS protocol 214, advisory locking 205 is implemented to secure files. Advisory locking 205 permits files or an arbitrary region of a file, within SWPARS file system 201, to be locked by a first device, and accessed but not modified by a second device.

Remote DPS 200 may provide SWPARs file system 201 to be accessed by different devices. In one embodiment, file locking is utilized to synchronize access to shared data. As files are accessed by client computer 204, client laptop 208, device(s) within storage area network (SAN) 206, and device(s) within computer network 210 via central server 202, SWPARs file system 201 are protected. Advisory locking 205 permits files (or a range of data within a file), of SWPARs file system 201, to be locked by a first device; thereby a second device may boot and read, but not modify the locked file. This locking appears to the client devices and the global system as being completed/triggered by the SWPAR and not from the global environment. In one embodiment, SWPARs file system 201 may be booted or initiated on one machine and restarted from another.

Figure 3:
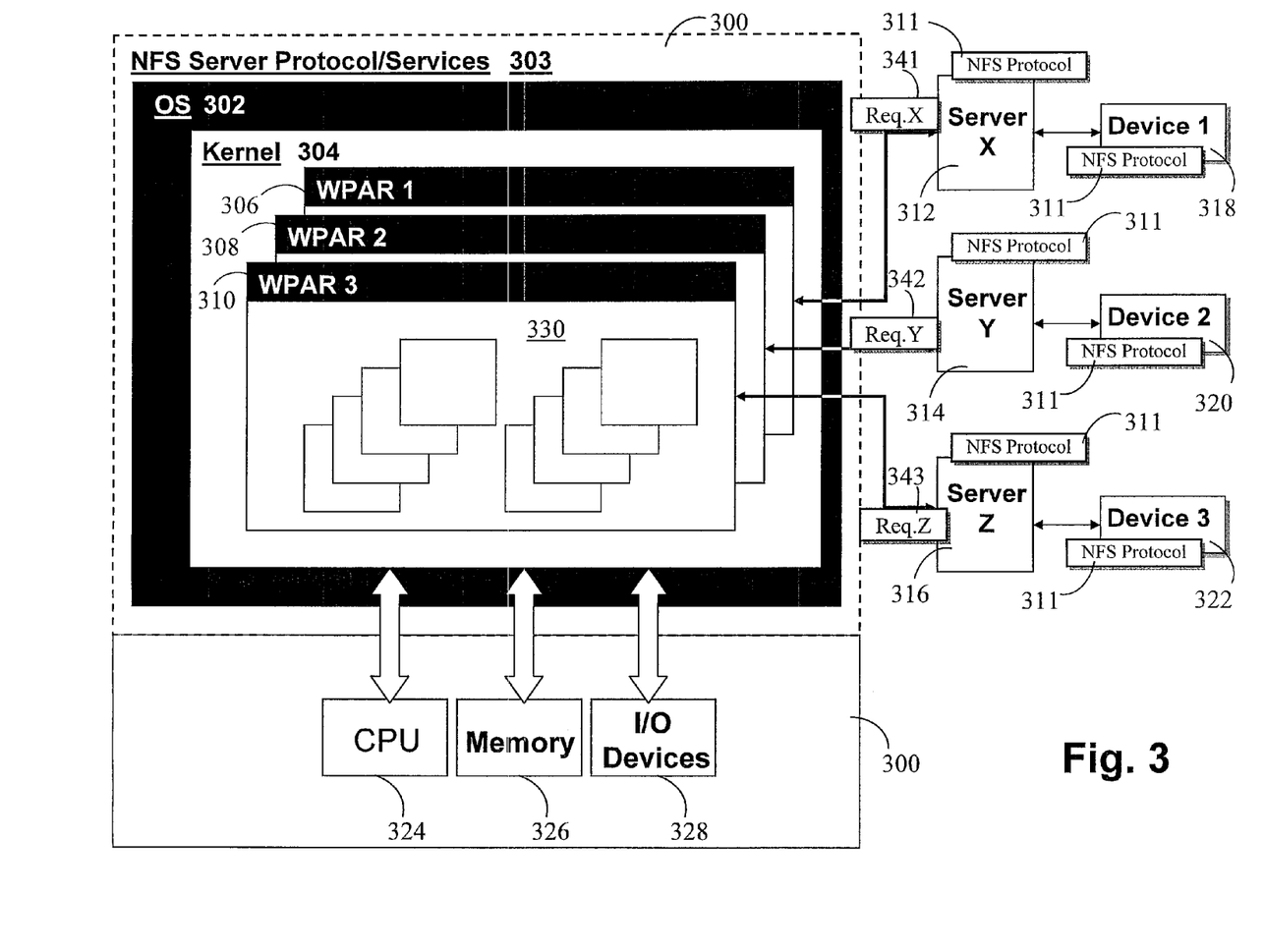
FIG. 3 is a schematic diagram illustrating software partition distribution according to one embodiment of the invention.

FIG. 3 illustrates the distribution of SWPARS to multiple servers. Kernel 304 (or NFS kernel) resides within global operating system (OS) 302 of global file system 301. Within remote data processing system 300, kernel 304 is shared across global file system 301 and supports access by the SWPARS application software to CPU 324, memory 326, and input/output (I/O) devices 328. Kernel 304 is the central module of global OS 302 and is loaded during OS boot and remains in memory 326 during SWPAR booting. Kernel 304 is responsible for memory management, process and task management, and local disk management.

A plurality of partitions, SWPAR (1) 306, SWPAR (2) 308, and SWPAR (3) 310 share kernel 304. Each SWPAR possess a unique IP address and other operating parameters as described above), and cannot be accessed without adherence to NFS server protocol 303. SWPAR (1) 306, SWPAR (2) 308, and SWPAR (3) 310 are requested and accessed by device (1) 318, device (2) 320, and device (3) 322 via NFS protocol 311 (e.g., mount, etc.). SWPAR (1) 306, SWPAR (2) 308, and SWPAR (3) 310 hold files 330 that may be accessed and modified. As illustrated, access to SWPAR (1) 306, SWPAR (2) 308, and SWPAR (3) 310 is accomplished utilizing server X 312, server Y 314, and/or server Z 316, respectively, via separate instances of user level NFS components.

In one embodiment, device (1) 318, device (2) 320, and device (3) 322 support NFS protocol 311. These devices may receive one of several types of requests, including (a) a first request to mount the network file system (NFS) exported by server X, Y or Z to the SWPAR on which the boot is initiated and (b) a second request to lock particular files, which request is made during the boot process of the SWPAR. The "advisory" locking of files is described above. As illustrated, device (1) 318, device (2) 320, and device (3) 322 receive respective requests (Req. X 341, Req. Y 342, Req. Z 343) to mount the file systems from SWPAR (1) 306, SWPAR (2) 308, and/or SWPAR (3) 310. These requests are transmitted to device (1) 318, device (2) 320, and device (3) 322 via corresponding server X 312, server Y 314, and server Z 316, respectively. The NFS protocol utilizes RPC protocols to communicate between the client device and server. RPC protocols allow the server to limit access privileges of the SWPAR file system to a restricted set of clients. The servers provide the remote access to the NFS via SWPAR file system. The remote procedure call (RPC) protocol working in conjunction with NFS server protocol 303 allows the remote data processing system 300 to access files 300 on the plurality of devices with the simplicity of accessing local files. When these requests are transmitted from remote data processing system 300, the requests trigger the NFS Server Protocol/Services 303 to initiate a boot of the corresponding SWPAR (306, 308 or 310).

In one embodiment, booting SWPAR (1) 306, SWPAR (2) 308, and SWPAR (3) 310 separately does not disrupt the functions of global OS 302, kernel 304, or any SWPAR running on CPU 324. The SWPARS of global OS 302 are booted independent of (and in addition to) the booted and functional global OS 302. Utilizing NFS protocol 311 reduces the introduction of additional protocols to boot SWPAR (1) 306, SWPAR (2) 308, and SWPAR (3) 310. Further configuration of server X 312, server Y 314, and server Z 316 is minimal, requiring only the configuration required for exporting files 330 of SWPAR (1) 306, SWPAR (2) 308, and/or SWPAR (3) 310.

Figure 4:
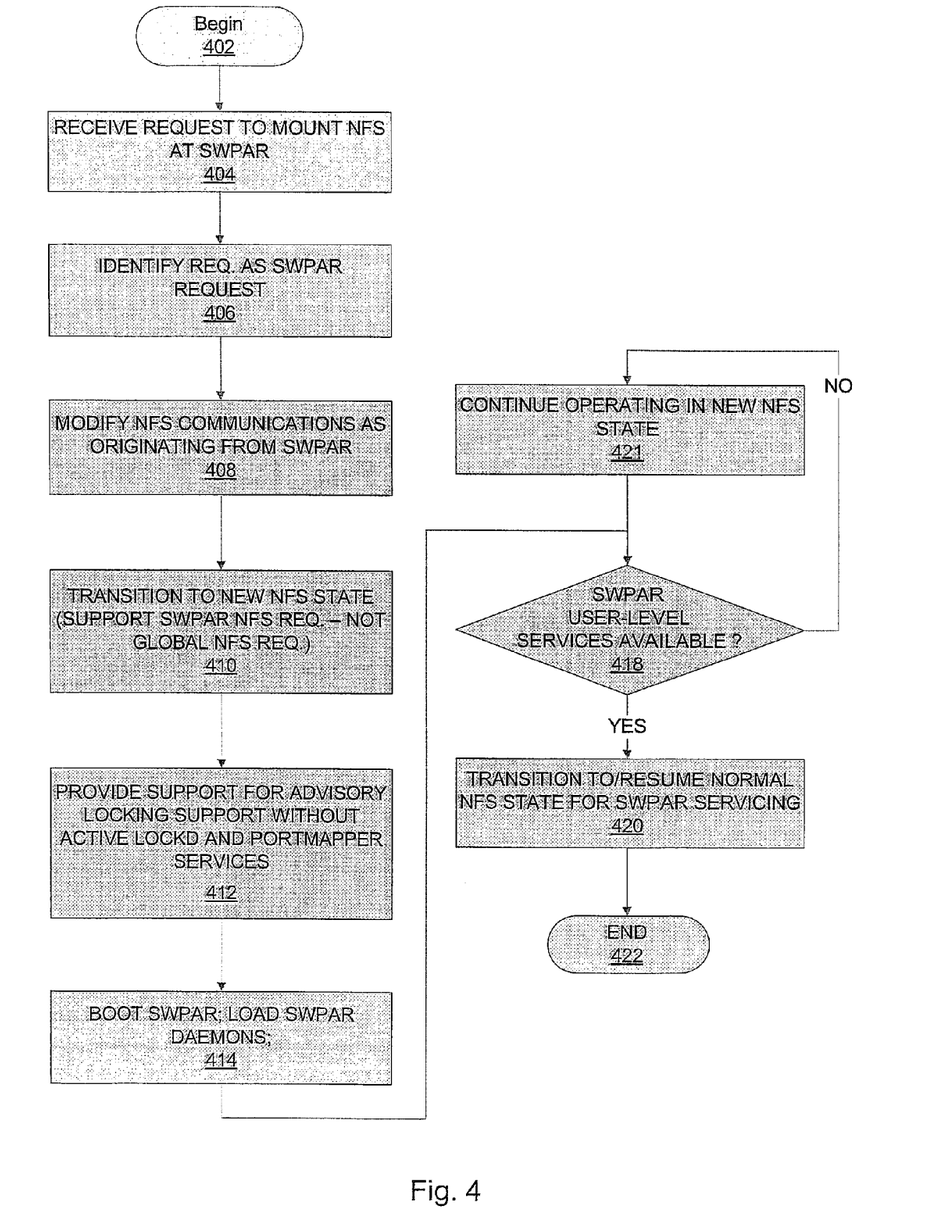
FIG. 4 is a logic flow chart illustrating the process of enabling remote booting of software partitions via NFS protocol, according to one embodiment of the invention.

FIG. 4 is a flow chart illustrating a method by which the processes of the illustrative embodiments are completed. Although the method illustrated in FIG. 4 may be described with reference to components shown in FIGS. 1-3, it should be understood that this is merely for convenience and alternative components and/or configurations thereof can be employed when implementing the method. Key portions of the methods may be completed by SWPAR utility 145 (along with certain functions of OS 135 and NFS 140) executing within DPS 100 (FIG. 3), 200 (FIG. 2), and/or 300 (FIG. 3) and controlling/enabling specific operations of DPS 100, and the methods are thus described from the perspective of SWPAR utility 145.

The process of FIG. 4 begins at initiator block 402. The method process is assume to commence after the global operating system of the DPS (remote DPS 200/300) has booted, is operational, and has created the software partitions.

At step 406, the SWPAR utility identifies the request as a SWPAR request and also identifies the specific requested SWPAR to which the request is transmitted. At step 408, the SWPAR utility also modifies the NFS communication so that the communication appears to originate from the SWPAR. The SWPAR utility also transitions the NFS to the new NFS state, at step 410. While in the new NFS state, the SWPAR utility and/or NFS services provides support for the user-level services (such as advisory locking and portmapper) services without actually having the lockd and portmapper services active, as indicated at step 412. NFS lock calls are handled without lockd user level components. For example, the NFS kernel component is forced into a polling mode for NFS lock request and replies to the request rather than relying on (or waiting for) the lockd instruction to perform the lock operation. Also, the modified kernel services activate advisory locking to synchronize access to the SWPAR file systems. Advisory locking of files within the SWPAR file system prevent files, or components of the files, from being modified when locked.

Then, the specific SWPAR is booted at step 414. Also, at step 414, the NFS kernel resources are loaded and utilized to obtain the daemons required to manage the RPC messaging and advisory locking. Daemons, such as portmap, rpc. lockd, and rpc.statd, operate during the booting process of the SWPAR, performing specific operations at predefined times and/or in response to an event that occurs during booting. When the daemons are loaded at step 414, subsequent processes such as normal advisory locking begins, and at step 416, NFS access is provided to the requesting device(s) via an advisory locking process. During the SWPAR booting process, no new protocols are introduced and advisory locking ensures file integrity through the boot up process.

At step 418, SWPAR utility checks whether the user-level services have become available for the SWPAR. When the user-level services are not yet available, the SWPAR's NFS continues operating in the new NFS state, as provided at step 421. When the user-level processes become available during or after the boot of the SWPAR, the SWPAR transitions the NFS back to the normal NFS state for continuing SWPAR NFS servicing at step 420. The process then ends at block 422.

Remote boot of the SWPAR is independent of the NFS services of the global system, and SWPAR boot and shut down from a remote client are both supported, independent of the boot of the global system OS. Mobility of the SWPARs is thus enabled.

In the flow chart above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer and/or server system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    mounting a network file system (NFS) hosted by an external server into a software partition (SWPAR) environment;
    transitioning to a first operating state that enables support for user-level NFS services without requiring the NFS services be active, wherein said transitioning to a first operating state comprises:
        activating a modified version of an NFS protocol to provide boot support for the SWPAR utilizing secondary services that are not tied to a global system environment; and
        returning to execution of a normal version of the NFS protocol which provides NFS user-level services tied to the SWPAR;
    automatically booting the SWPAR and enabling access to the SWPAR during operation in the first operating state; and
    subsequently transitioning to a second, normal operating state in which SWPAR operates as a standalone device providing NFS services to the client.

2. The method of claim 1, wherein:
    the SWPAR environment hosts NFS services and supports access to the NFS via NFS protocol;
    said mounting includes transmitting a request to mount the NFS; and
    said method further comprises:
        identifying the request as a NFS mount request associated with a specific SWPAR;
        modifying NFS communication as communication originating from the SWPAR; and
        initiating a boot up sequence of the specific SWPAR providing the NFS mount request, wherein said boot up sequence is initiated, independent of a prior boot up sequence of an operating system (OS) of the global system environment.

3. The method of claim 2, wherein the request includes a request for a lock and said method further comprises enabling advisory locking of files during the boot of the SWPAR to ensure file integrity.

4. The method of claim 1, further comprising:
    providing of one or more SWPARs within a single instance of an operating system (OS), wherein each of the one or more SWPARs provides a functional appearance of a stand alone device executing a separate copy of the OS, and wherein each of said one or more SWPARs is individually bootable, independent of the OS and other SWPARs, wherein said providing includes:
        isolating software services, applications, and administration of the operating system to create the plurality of workload partitions; and
        assigning a unique IP address and other unique operating parameters to each workload partition; and
    enabling access to at least one of the one or more SWPARs via one or more network connected devices supporting NFS protocol operation, in response to a received request from the one or more network connected devices.

5. The method of claim 4, further comprising:
    enabling the mount of the NFS via a transmitted request to a NFS server, which processes the request for access to the SWPAR file system through the remote procedure call (RPC) protocol; and
    booting one or more of the SWPARs, while simultaneously running the operating system.

6. The method of claim 1, wherein said boot of the SWPAR comprises:
configuring one or more SWPAR devices;
loading one or more SWPAR daemons for booting and operating the SWPAR;
initiating an initial process to start one or more SWPAR system services; and
loading NFS kernel resources, wherein the NFS kernel resources are shared with all SWPARs and provides the user-level services, including lockd and portmapper.

7. A computer product comprising:
a machine readable storage medium; and
program code on the machine readable storage medium that when executed by a processor provides the functions of:
mounting a network file system (NFS) hosted by an external server into a software partition (SWPAR) environment;
transitioning to a first operating state that enables support for user-level NFS services without requiring the NFS services be active, wherein said transitioning to a first operating state comprises:
activating a modified version of an NFS protocol to provide boot support for the SWPAR utilizing secondary services that are not tied to a global system environment; and
returning to execution of a normal version of the NFS protocol which provides NFS user-level services tied to the SWPAR;
automatically booting the SWPAR and enabling access to the SWPAR during operation in the first operating state; and
subsequently transitioning to a second, normal operating state in which SWPAR operates as a standalone device providing NFS services to the client.

8. The computer program product of claim 7, wherein:
the SWPAR environment hosts NFS services and supports access to the NFS via NFS protocol;
said mounting includes transmitting a request to mount the NFS; and
said code further comprises code for:
identifying the request as a NFS mount request associated with a specific SWPAR;
modifying NFS communication as communication originating from the SWPAR; and
initiating a boot up sequence of the specific SWPAR providing the NFS mount request, wherein said boot up sequence is initiated, independent of a prior boot up sequence of an operating system (OS) of the global system environment.

9. The computer program product of claim 8, wherein the request includes a request for a lock and said code further comprises code for enabling advisory locking of files during the boot of the SWPAR to ensure file integrity.

10. The computer program product of claim 7, further comprising code for:
providing of one or more SWPARs within a single instance of an operating system (OS), wherein each of the one or more SWPARs provides a functional appearance of a stand alone device executing a separate copy of the OS, and wherein each of said one or more SWPARs is individually bootable, independent of the OS and other SWPARs, wherein said providing includes:
isolating software services, applications, and administration of the operating system to create the plurality of workload partitions; and
assigning a unique IP address and other unique operating parameters to each workload partition; and
enabling access to at least one of the one or more SWPARs via one or more network connected devices supporting NFS protocol operation, in response to a received request from the one or more network connected devices.

11. The computer program product of claim 10, further comprising code for:
enabling the mount of the NFS via a transmitted request to a NFS server, which processes the request for access to the SWPAR file system through the remote procedure call (RPC) protocol; and
booting one or more of the SWPARs, while simultaneously running the operating system.

12. The computer program product of claim 7, said code for booting the SWPAR further comprising code for:
configuring one or more SWPAR devices;
loading one or more SWPAR daemons for booting and operating the SWPAR;
initiating an initial process to start one or more SWPAR system services; and
loading NFS kernel resources, wherein the NFS kernel resources are shared with all SWPARs and provides the user-level services, including lockd and portmapper.

13. A computer system comprising:
a processor component;
an input/output (I/O) mechanism that enables managing software partitions (SWPARS);
a mechanism for receiving request for access to SWPARS on the device; and
a utility executing on the processor component and which comprises code that enables completion of the functions of:
mounting a network file system (NFS) hosted by an external server into a software partition (SWPAR) environment;
transitioning to a first operating state that enables support for user-level NFS services without requiring the NFS services be active, wherein said transitioning to a first operating state comprises:
activating a modified version of an NFS protocol to provide boot support for the SWPAR utilizing secondary services that are not tied to the global system environment; and
returning to execution of a normal version of the NFS protocol which provides NFS user-level services tied to the SWPAR;
automatically booting the SWPAR and enabling access to the SWPAR during operation in the first operating state; and
subsequently transitioning to a second, normal operating state in which SWPAR operates as a standalone device providing NFS services to the client.

14. The computer system of claim 13, wherein:
the SWPAR environment hosts NFS services and supports access to the NFS via NFS protocol;
said mounting includes transmitting a request to mount the NFS; and
said utility further comprises code for:
identifying the request as a NFS mount request associated with a specific SWPAR;
modifying NFS communication as communication originating from the SWPAR; and initiating a boot up sequence of the specific SWPAR providing the NFS mount request, wherein said boot up sequence is initiated, independent of a prior boot up sequence of an operating system (OS) of the global system environment.

15. The computer system of claim 13, said utility further comprising code for:
providing of one or more SWPARs within a single instance of an operating system (OS), wherein each of the one or more SWPARs provides a functional appearance of a stand alone device executing a separate copy of the OS, and wherein each of said one or more SWPARs is individually bootable, independent of the OS and other SWPARs, wherein said providing includes:
isolating software services, applications, and administration of the operating system to create the plurality of workload partitions; and
assigning a unique IP address and other unique operating parameters to each workload partition; and
enabling access to at least one of the one or more SWPARs via one or more network connected devices supporting NFS protocol operation, in response to a received request from the one or more network connected devices.

16. The computer system of claim 15, wherein said utility further comprising code for:
enabling the mount of the NFS via a transmitted request to a NFS server, which processes the request for access to the SWPAR file system through the remote procedure call (RPC) protocol; and
booting one or more of the SWPARs, while simultaneously running the operating system; and
when the request includes a request for a lock, said utility further comprises code for enabling advisory locking of files during the boot of the SWPAR to ensure file integrity.

17. The computer program product of claim 13, said code for booting further comprising code for:
configuring one or more SWPAR devices;
loading one or more SWPAR daemons for booting and operating the SWPAR;
initiating an initial process to start one or more SWPAR system services; and
loading NFS kernel resources, wherein the NFS kernel resources are shared with all SWPARs and provides the user-level services, including lockd and portmapper.

* * * * *